United States Patent [19]

Duncker et al.

[11] 4,454,864

[45] Jun. 19, 1984

[54] SOLAR COLLECTOR COMPRISING A HEAT EXCHANGER

[75] Inventors: Michiel J. Duncker, Arnhem; Johan R. Kreetz, Laag Soeren, both of Netherlands

[73] Assignee: Akzo N.V., Arnhem, Netherlands

[21] Appl. No.: 227,529

[22] Filed: Jan. 22, 1981

[30] Foreign Application Priority Data

Jan. 25, 1980 [NL] Netherlands ............... 8000469

[51] Int. Cl.³ ............................. F24J 3/02
[52] U.S. Cl. ........................ 126/433; 165/104.21
[58] Field of Search ........... 126/433; 165/133, 104.14, 165/104.21, 76, 11 A; 237/2 B

[56] References Cited

U.S. PATENT DOCUMENTS

| | | |
|---|---|---|
| 3,018,087 | 1/1962 | Steele . |
| 3,875,926 | 4/1975 | Frank . |
| 3,923,038 | 12/1975 | Cutchaw . |
| 4,003,367 | 1/1977 | Wikholm . |
| 4,009,417 | 2/1977 | Waldon et al. ............ 165/104.14 |
| 4,029,081 | 6/1977 | Strong . |
| 4,033,325 | 7/1977 | Walker . |
| 4,038,966 | 8/1977 | Harrison . |
| 4,062,351 | 12/1977 | Hastwell . |
| 4,088,118 | 5/1978 | Benseman ............. 165/104.14 |
| 4,131,158 | 12/1978 | Abhat et al. ............ 165/104.14 |
| 4,195,688 | 4/1980 | Fujie et al. ............. 165/133 |

FOREIGN PATENT DOCUMENTS

| | | |
|---|---|---|
| 257348 | 10/1948 | Switzerland . |
| 1304771 | 1/1973 | United Kingdom . |
| 1313525 | 4/1973 | United Kingdom . |
| 1542396 | 3/1979 | United Kingdom . |
| 2013870 | 8/1979 | United Kingdom . |
| 2023804 | 1/1980 | United Kingdom . |

OTHER PUBLICATIONS

The Heat Pipe by Eastman–Scientific American, May 1968 Applications of the Heat Pipe–by Feldman–Mechanical Eng. 11/68, Heat Pipes–by Dunn et al.–Pergamon Press, 1976.

Primary Examiner—Albert J. Makay
Assistant Examiner—Henry Bennett
Attorney, Agent, or Firm—Posnack, Roberts, Cohen & Spiecens

[57] ABSTRACT

Solar collector comprising a closed housing of mainly rectangular cross-section, a collector thermally connected to the housing for converting solar rays into heat, a working fluid which, during operation, is partly liquid and partly gaseous, an evaporation space within the housing, a condensation space within the housing, an internal connection between said spaces, and a heat exchanger. An intensive thermal contact between the heat exchanger and the working fluid is obtained by providing the condensation space with a wall profiled inwardly of the housing and forming a space substantially shut off from the surrounding atmosphere, the space being positioned within the outer boundary of the housing but outside the internal portion thereof, and by disposing the heat exchanger within the space and in thermal contact with the wall.

13 Claims, 28 Drawing Figures

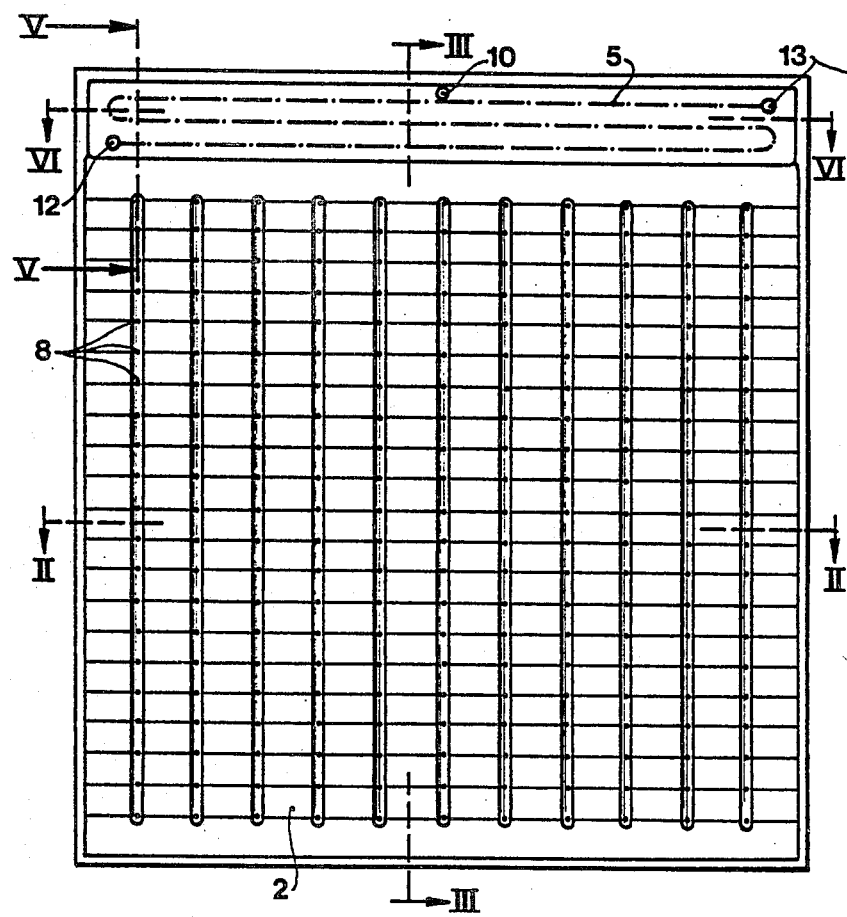
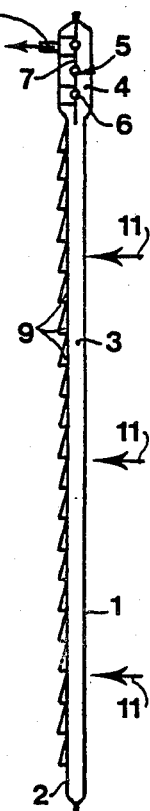
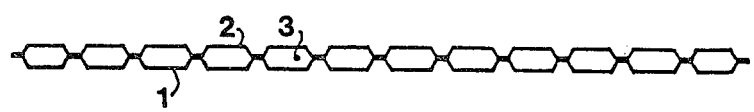

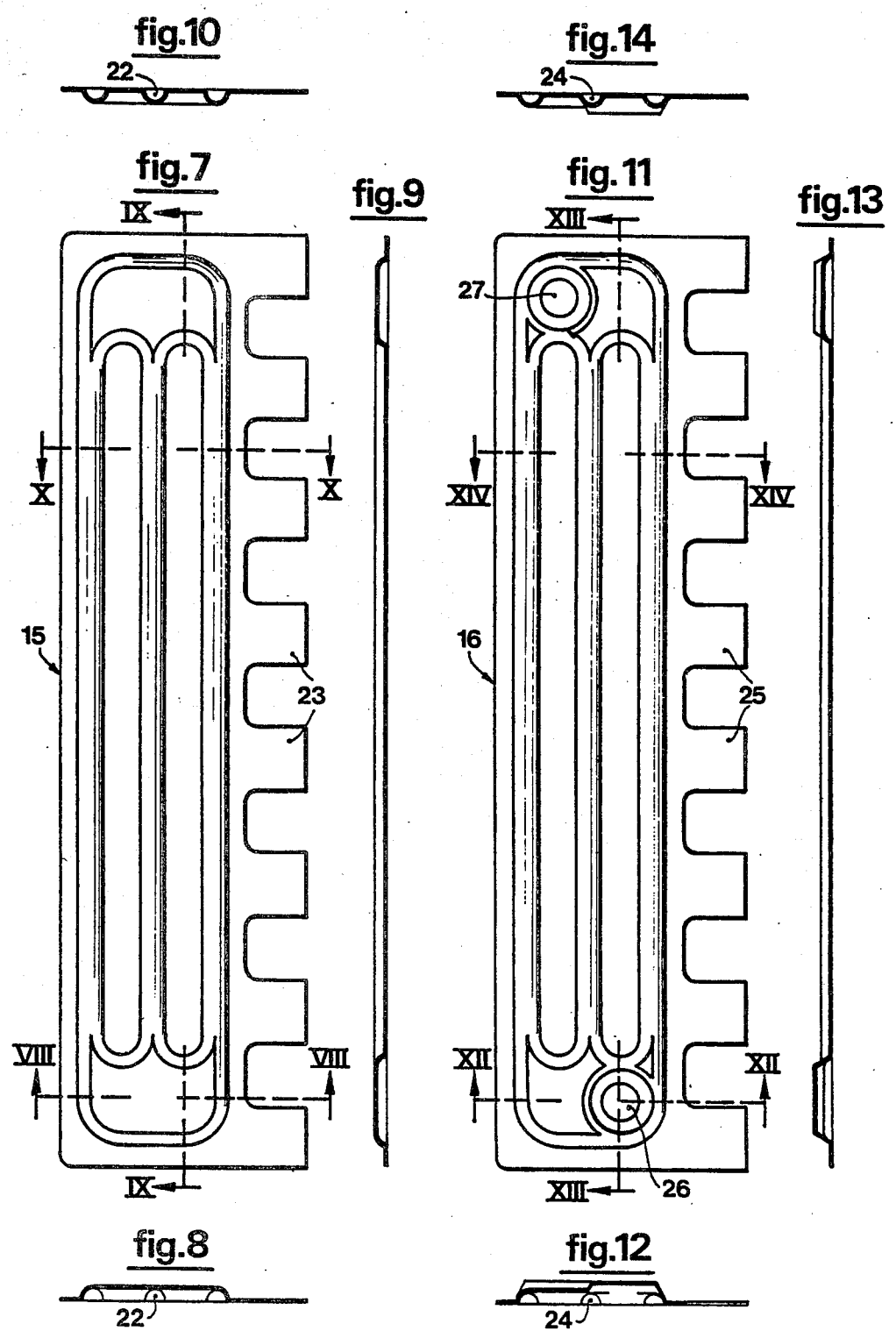

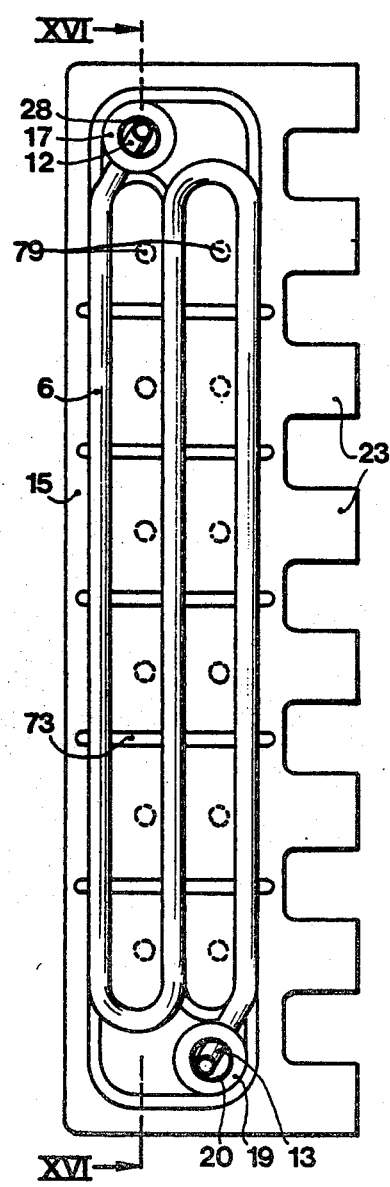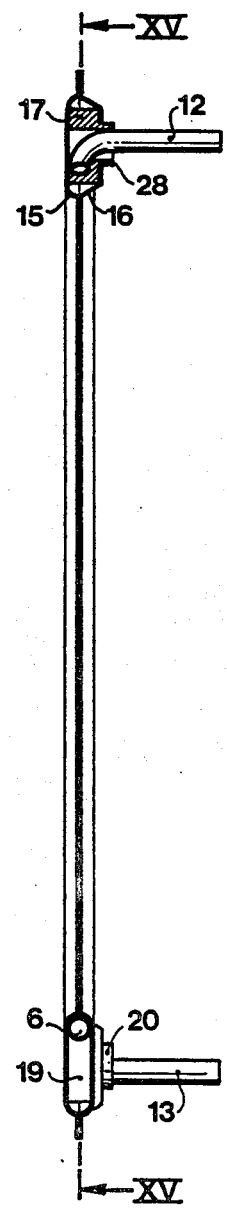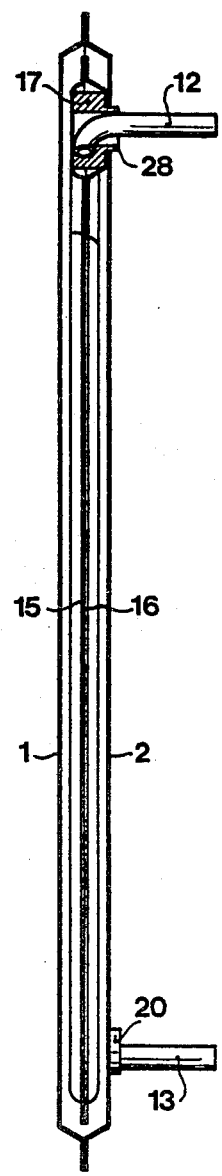

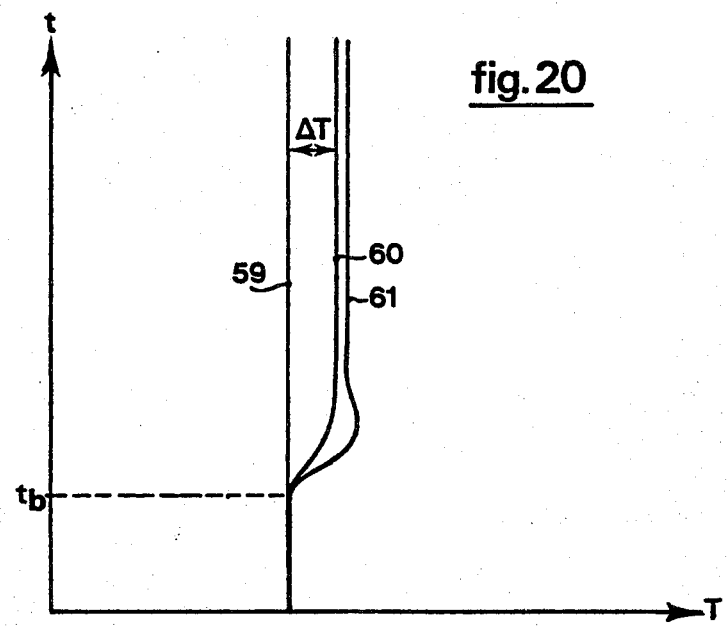
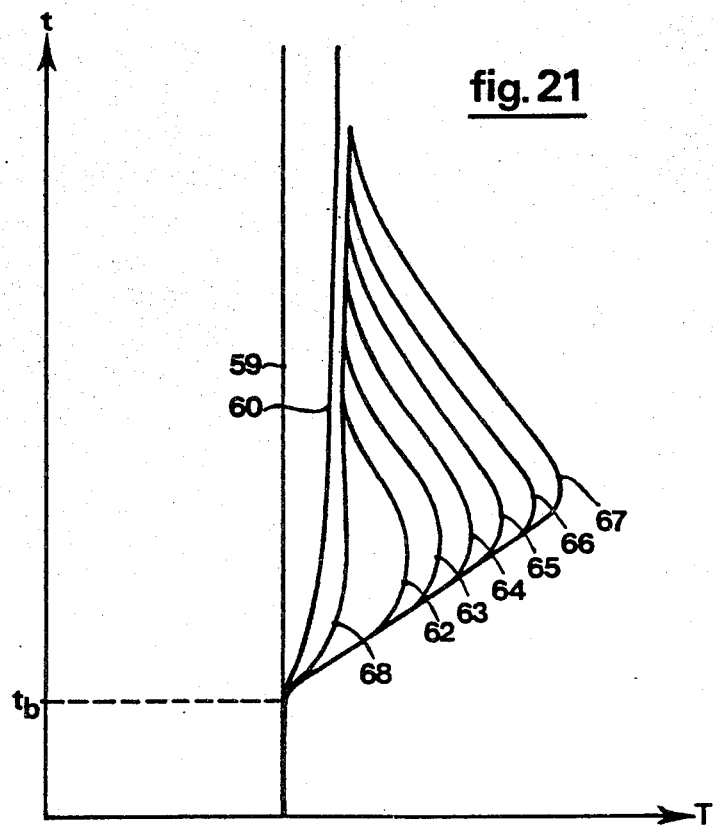

SOLAR COLLECTOR COMPRISING A HEAT EXCHANGER

FIELD OF THE INVENTION

The invention relates to a solar collector comprising a closed casing having a substantially rectangular cross-section from which non-condensable gases are at least substantially removed, a collector thermally connected to the casing and serving to convert solar rays into heat, a working medium contained in the casing, which working medium in operation of the collector, is partly in the liquid and partly in the vapor state, an evaporating region in the casing, in which region the liquid working medium can evaporate under the influence of the heat emitted by the collector, a condensation region in the casing, in which region the vaporous working medium can condense, a passage connecting the evaporating region and the condensation region permitting the internal return of condensed working medium to the evaporating region, and a heat exchanger which is in thermal contact with the condensation region for carrying off heat of condensation to a heat storage medium contained in the heat exchanger. By the above passage: "from which non-condensable gases are at least substantially removed" is meant that from the casing all gases are removed that do not positively contribute to the functioning of the solar collector. As a rule, the gas here will be air.

By heat storage medium is to be understood here a flowing or non-flowing medium to which the heat of condensation is given off.

A solar collector of this kind is known from, for instance, the paper "The heat pipe fin, a novel design of a planar collector", 1975 International Solar Energy Congress and Exposition, July 28–Aug. 1, 1975, Los Angeles, Calif., U.S.A. The solar collector described in this paper is contained in an elongated casing having a V-shaped cross-section. In this casing is a tubular condenser which acts as a heat exchanger, which in its turn functions as a heat pipe. One wall of the casing serves as a collector, i.e. it collects the solar rays and converts them into heat. This heating causes the working medium contained in the casing to evaparate; this evaporation is stimulated by a wick which is placed on the inside of the casing; this wick is a layer of absorbent material which spreads the liquid working medium over the collector surface. The vaporous working medium then rises to the condensation region, where it precipitates on the tubular condenser. Here it gives off heat of condensation to the medium contained in the condenser tube. The condensed working medium drips from the condenser onto the wick, by which it is fed back to the collector wall of the casing under the influence of gravity and capillary action.

A solar collector of this kind is also described in Netherlands Patent Application No. 7 707 586. Unlike the first-mentioned known solar collector, however, it is not provided with a wick. The working liquid fills practically the entire evaporating region, so that a thermal contact is established between much of the working liquid and the collector. With a particular embodiment of this known solar collector the condenser is positioned inside the casing, i.e. in the condensation region. Over an externally positioned condenser this arrangement as such offers the advantage of a better heat-exchanging contact. A disadvantage to it, however, consists in that the passage of the condenser through the casing must satisfy special requirements. For, this passage must first of all be gas-tight in order that no working medium should be lost or air should come in from the ambient atmosphere. Further, it should, as much as possible, be prevented that in places where condensation is undesirable the casing cools off excessively as a result of direct contact of metal with the condenser.

SUMMARY OF THE INVENTION

The solar collector according to the invention is characterized in that the condensation region has an inwardly folded wall which forms a space that is partially closed off from the ambient environment, which space is disposed within the outer boundary of the casing, but outside the internal part of the casing, and the heat exchanger is accommodated in said space and is in thermal contact with said wall. An advantage to this construction is that although the heat exchanger is inside the casing, it is in a more intimate thermal contact with the working medium than is the case with known solar collectors provided with an external condenser. For the internal return flow of the condensate (the condensed working medium) to the evaporating region use could be made of a wick. Its use would provide some freedom as to the position of the condensation region relative to the evaporating region. Thus, due to the capillary transport of the wick, the condensate could be transported to a somewhat higher point in order to get into the evaporating region. However, such a wick, which only serves to transport the condensate to the evaporating region, is not necessary if in the operating position the condensation region is located somewhat higher than the evaporating region. In such a case the condensate flows back under the influence of gravity. The condensation region may then be placed above and in a staggered position relative to the evaporating region, in accordance with the construction described in Netherlands Patent Application No. 7 802 076 laid open to public inspection. Although such a disposition of the condensation region results in a solar collector which, perpendicular to the plane of the collector, is of greater dimension than in the case where the condensation region is in line with the evaporating region, such an arrangement offers thermal advantages. For in that case the condenser can be more satisfactorily insulated from losses of heat.

From a constructional point of view, however, the most suitable arrangement consists in that the condensation region is placed over and in line with the evaporating region. In that case the two regions or compartments can be assembled into one integral construction in a relatively simple manner.

Although the inwardly folded wall of the condensation region could be formed integral with the casing, it is from a constructional point of view of advantage that this wall should be formed by a gas-tight plate attached to the casing and the heat exchanger should have a cooling spiral which is in thermal contact with the outside of the plate. The material of this plate can be so chosen that it can be attached gastight to the casing without any difficulty, for instance by welding or brazing. So there will be no such problems here that are met when the passage through a casing of plate steel of a copper cooling spiral of an internal heat exchanger is made gas-tight.

In a different embodiment of the solar collector according to the invention the wall is formed by a gastight assembly of two cooling plates attached to the casing, which cooling plates enclose a space for the passage of the heat storage medium. The wall formed by the two cooling plates also constitutes the heat exchanger. This kind of embodiment can be used in an apparatus in which the heat storage medium heats a tank containing tapwater via a second heat exchanger accommodated in the tank. This second heat exchanger will then as a rule be double-walled in order as much as possible to exclude the chance of contamination of the tap water by the heat storage medium. A suitable alternative embodiment is characterized in that the wall is formed by a gas-tight assembly of two cooling plates attached to the casing and the heat exchanger has a cooling spiral which is enclosed by the cooling plates. By attaching these cooling plates to each other at their edges in such a manner, for instance by welding or soldering, that the space between them is hermetically sealed from the inside of the casing, the medium in the cooling spiral is surrounded by a double wall. The cooling spiral can then be directly connected to the water mains system. By preference the solar collector having a cooling spiral is characterized in that the ends of the cooling spiral project transversely through the casing via passages therein at which the casing is sealed from the ambient atmosphere. Direct thermal conductance between the heat exchanger and the casing will then be restricted to the annular area of contact around the passages.

In the construction of the solar collector according to the invention having a cooling spiral enclosed by cooling plates, the passages are preferably sealed by an assembly of cooling plates. For that construction it is recommended that between the cooling plates and on the ends of the cooling spiral there are provided supporting rings which have a relatively narrow part projecting through the passages and have one end face bearing against the inside of one of the cooling plates and the outer end face, adjacent to said narrow part, bearing against the other cooling plate. The supporting rings make it possible for the sealing of the passages to be effected by projection welding. A further improvement to this construction consists in that on the narrow part of each supporting ring, and between the respective cooling plate and the inside of the casing there is provided a metal sleeve whose ends are welded to the cooling plate and the casing.

With a solar collector provided with cooling plates and contained in a casing formed by two plates which are so profiled that the evaporating region is divided into at least two parallel channels for the transport of the working medium in the vapor and in the liquid state, it is of advantage to provide the cooling plates with projections that are disposed over the channels. The condensed working medium will then collect at the projections, which cause the condensate to flow into the respective channels. A simple construction of the solar collector according to the invention is characterized in that the collector is formed by a sun facing part of the casing.

In order that the best possible results may be obtained with a minimum amount of working medium it is recommended that the internal part of the casing should be provided with means for permitting uniform distribution of working liquid.

These means may be provided only on the sun facing wall of the casing or only on the wall opposite to it. It is preferred that the means for distributing the working liquid be provided on both sides of the evaporating region. During cooling overnight, the working liquid may then collect on the side which faces the sun in the day time, and during solar radiation on the opposite side.

In accordance with a further characteristic feature of the solar collector according to the invention, the casing is provided with a profiled surface for distributing the working liquid.

The surface may be so profiled that channels are formed that extend transverse to the direction of flow of the condensed working medium, or pits.

Alternatively, the means for distributing the working liquid may be formed by a material absorbing the working medium, which material is preferably interrupted in the direction of flow of the condensed working medium.

Further features of the solar collector according to the invention will be apparent from the following description of several embodiments with reference to the accompanying drawings.

BRIEF DESCRIPTION OF THE DRAWINGS

FIG. 1 is a diagrammatic view of a solar collector according to the invention;

FIGS. 2 and 3 are sectional views along the lines II—II and III—III, respectively, in FIG. 1;

FIGS. 7 through 16 show the condenser of a solar collector according to the invention used in the constructions according to FIGS. 4, 5 and 6;

FIG. 17 is a sectional view of a solar collector according to the invention containing the condenser;

FIGS. 18 through 21 relate to a measuring arrangement for testing a solar collector according to the invention;

DETAILED DESCRIPTION

Figure 4:
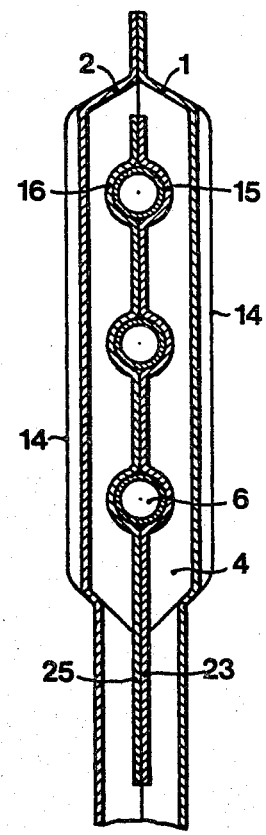
FIG. 4 is the condensation region of a solar collector according to the invention in a sectional view corresponding to FIG. 3.

FIGS. 1, 2 and 3 are schematic views of the solar collector according to the invention. FIG. 1 is a plan view of the solar collector. FIG. 2 is a sectional view of the collector along the line II—II, and FIG. 3 is a sectional view along the line III—III in FIG. 1.

The solar collector comprises a casing of substantially rectangular cross-section formed by two steel plates 1, 2. As is shown in FIG. 2, the plates are so shaped that they enclose hexagonal channels 3. The channels 3 form an evaporating region which opens into a condensation region 4. As apparent in FIG. 3, the two plates 1, 2 are a little further apart at their upper ends, permitting the condensation region to accommodate a heat exchanger 5 provided with a cooling spiral 6 and a cooling plate 7.

The plates 1, 2 are joined by lap welding, so that a sealed casing is formed permitting a pressure to be maintained in it which is lower or higher than the ambient pressure. For the casing to have sufficient strength the plates 1, 2 are welded to each other at different points 8.

These joints also contribute to obtaining a good thermal contact between the two plates.

As is shown in FIG. 3, the back plate 2 is provided with channel-shaped protrusions 9. In the casing formed by the plates 1, 2 is an appropriate working medium 5 which upon heating evaporates and upon cooling emits the absorbed heat in the form of heat of condensation. To promote evaporation the non-condensable gases have been removed from the interior of the casing. To that end the solar collector is provided with an evacuation nipple 10, which is also used for filling the solar collector with working liquid.

The solar collector operates as follows. Its position is assumed to be such that solar radiation is incident approximately at right angles to it, as indicated in FIG. 3 by the arrows 11. The sun rays heat the front plate 1 acting as a collector, so that its temperature increases. Since the back plate 2 is connected to the front plate 1 in proper thermally conductive contact, its temperature will also rise. The working liquid contained in the channel-like protrusions on the wall of the channel 3 will evaporate and the vapor will rise into the condensation region 4. There the working vapor will condense on the cooling plate 7 and released heat of condensation is given off to a heat transporting medium flowing through the cooling spiral 6. This medium is passed through the cooling spiral via the connections 12, 13 provided on the solar collector.

Under the influence of gravity the condensed working medium (the working liquid) flows back into the channels 3 and successively fills the channel-shaped protrusions 9 in the back plate 2. The back plate 2, which has practically the same temperature as the front plate 1, causes the working liquid to evaporate, so that the above-described cycle is repeated.

In the absence of sunshine, the solar collector will cool off. The temperature of the front plate 1 may then decrease to a value which is somewhat below that of the back plate 2 and the condensation region 4. As a result, the condensation of the gaseous medium will be displaced to the front plate 1, which is therefore also preferably provided with channel-shaped protrusions. After the sun has come out again, first the temperature of the front plate 1 will rise, as a result of which the working liquid will evaporate again. The working vapor rises and precipitates on the heat exchanger 5. Then the condensate spreads over the back plate 2, as described hereinbefore.

In the absence of provisions on the front plate 1 for a proper distribution over it of the working liquid the condensate would, upon transition to a period without sunshine, flow down over the somewhat cooler front plate and collect on the bottom of the solar collector. In that case it will take considerably longer for the solar collector to attain its maximum efficiency after the sun has come out again. This delay is due to evaporation of the condensate contained in the lower part of the solar collector taking longer than evaporation of condensate which is evenly distributed over the front plate 1.

Figure 5:
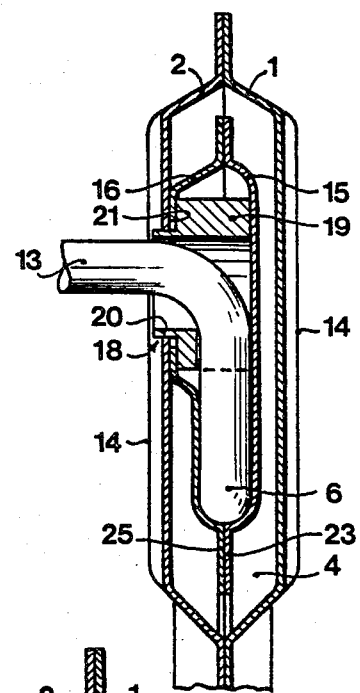
FIG. 5 is a sectional view along the line V—V in FIG. 1.
Figure 6:
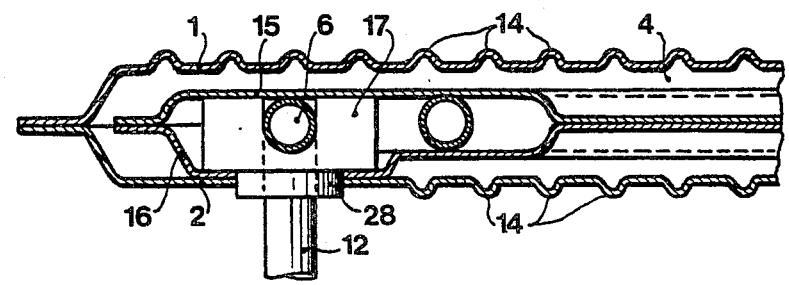
FIG. 6 is a sectional view along the line VI—VI in FIG. 1.

FIGS. 4, 5 and 6 show further details of the construction of the condensation region 4. FIG. 4 shows the condensation region 4 in a sectional view corresponding to FIG. 3; FIG. 5 is a sectional view along the view V—V in FIG. 1 and FIG. 6 is a sectional view along the line VI—VI in FIG. 1.

At the condensation region 4 the construction is reinforced by providing the plates 1, 2 with a wavy profile 14. In the condensation region the plates 1, 2 cannot be attached to each other by welding over their entire extent due to the presence of spiral 6. As is apparent in the FIGS. 4, 5 and 6, the cooling spiral 6 is enclosed by two cooling plates 15, 16, which are of steel, as are the plates 1, 2. The cooling plates 15, 16 are so welded to each other and to the casing that the space they enclose does not communicate with the inside of the solar collector. FIGS. 5 and 6 show how this enclosed space is sealed from the inside of the casing at the passages for the cooling spiral. For each end of the cooling spiral 6 the back plate 2 is provided with a round passage. The passage for the end 13 is indicated by the reference numeral 18. On this end 13 there is placed a supporting ring 19 whose narrowed part 20 projects through the passage 18. One end face of the supporting ring 19 bears against the cooling plate 15, whereas the shoulder 21 of the supporting ring bears against the cooling plate 16.

The assembly comprising the cooling spiral 6, cooling plates 15, 16 and supporting rings 17, 19 is first placed on the back plate 2 with the two supporting rings projecting through the passages. Subsequently, while applying pressure to the cooling plate 15 at the supporting rings, the cooling plate 16 is welded to the back plate 2 by making an annular projection weld around the passages. Since both the cooling plate 16 and the back plate 2 are of the same material (steel), there will be no such sealing problems as may be met with known solar collectors comprising an internal cooling spiral of copper and with the remaining part of the solar collector being of steel.

The slight direct thermal contact between the condenser 15, 6, 16 and the casing 2, 3 contributes to the solar collector giving off little heat to the ambient atmosphere in periods without sunshine. The solar collector consequently functions as a thermal diode, which is of particular importance in overcast periods attended with a low outside temperature.

Figure 22:
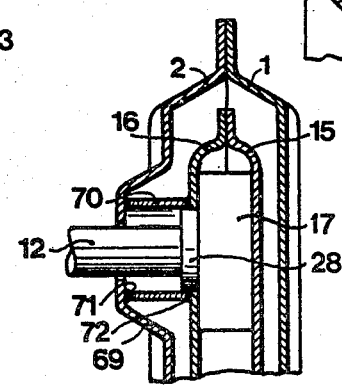
FIG. 22 is a detail view of a variant of the solar collector according to the FIGS. 4, 5 and 6.

The diode action can still be improved in the manner indicated in FIG. 22. It illustrates in detail a somwhat different way of attaching the condenser to the back plate 2. As its passage for the cooling spiral the back plate 2 is provided with a recessed part 69. Between the lower part of this recess and the cooling plate 16 is a steel sleeve 70. The latter is attached to the back plate 2 and the cooling plate 16 by projection welding in the above-described manner. The welds are designated to by the numerals 71, 72. By using stainless steel for sleeve 70 the heat transmission resistance between the cooling plate and the back plate 2 may be further increased.

FIGS. 7 through 15 are detail views of the condenser 6, 15, 16 of the construction according to FIGS. 4, 5 and 6. FIGS. 7 through 10 show the cooling plate 15 and FIGS. 11 through 14 the cooling plate 16. FIG. 7 shows the cooling plate 15 in an outside view of the condenser in the assembled state. As illustrated by the various sectional views in FIGS. 8, 9 and 10, the cooling plate 15 has a particular profile which, on the one hand, serves to provide a space for the cooling spiral between the two cooling plates of the condenser and on the other to obtain a satisfactory heat transfer between the cooling plates and the cooling spiral. For this latter purpose, the cooling plate 15 is provided with elongated recesses 22 which are so formed that the cooling spiral closely fits in them. On its underside the cooling plate 15 is provided with tooth-shaped projections 23. In the assembled state of the solar collector each of these projections is positioned over a channel 3 of the evaporating region. The projections 23 serve to guide the condensed working medium into the channels 3, also when the left-hand and the right-hand end of the condenser are not disposed at quite the same level. FIG. 11 is an elevational view of the other cooling plate 16. As in the cooling plate 15, cooling plate 16 is provided with elongated recesses 24 and tooth-shaped projections 25. Moreover, the cooling plate 16 is provided with passages 26, 27 for the ends of the cooling spiral. These passages register with the passages in the back plate 2. FIG. 15 is an inside view of the cooling plate 15 of FIG. 7, with inserted cooling spiral 6. FIG. 15 also shows the supporting rings 17, 19 with their narrow parts 28 and 20, respectively placed on the ends 12, 13 of the cooling spiral 6. When the cooling plate 16 according to FIG. 11 is positioned against the cooling plate 15 according to FIG. 15, then the ends 13, 12 of the cooling spiral 6 project through the passages 26 and 27, respectively, of the cooling plate 16. FIG. 15 further shows that the cooling plate 15 is provided with ribs 73. They prevent the condensate from being unevenly distributed among the evaporating channels 3. The condensate formed between two neighboring ribs is caused to flow via the tooth 23 positioned between these ribs.

To permit the discharge of condensate collecting on the outside of the elongated recesses 22, 24 of the cooling plates 15 and 16, respectively, the cooling plates may be provided locally with holes, which are schematically indicated in FIG. 15 by the dotted circles 79. To prevent the inside of the solar collector from communicating with the ambient atmosphere via these holes, the edges of each pair of facing holes 79 are attached to each other by projection welding. FIG. 16 is a sectional view of the condenser in this assembled state, along the line XVI—XVI in FIG. 15. FIG. 15 in turn is a sectional view along the line XV—XV in FIG. 16.

FIG. 17 is a sectional view of the solar collector comprising the condenser. The plane along which this section is drawn runs through the condensation region above the condenser. For simplicity, the front plate 1 and the back plate 2 are drawn in their plain, non-profiled state. The solar collector according to the invention, of course, permits taking all known steps that are required in order to attain maximum effectiveness. For instance, the solar collector may be accommodated in a casing which is provided with a sunlight transmitting single or multiple cover, which may, for instance, be of glass or plastics material and may further contain insulating material to prevent loss of heat. The collector preferably comprises a spectral-selective layer which combines a high absorption factor $\alpha$ for visible light with a low emission factor $\epsilon$ for the infrared region.

To reduce loss of heat to a minimum it is recommended that at the condensation region 4 (see FIGS. 3 through 6) the inside surfaces of the plates 1 and 2 be provided with a reflecting layer. Such a layer may be obtained, for instance, by locally subjecting the inside surfaces of the plates 1 and 2 to a polishing treatment or providing these surfaces with a foil of metal, such as aluminum, having a high coefficient of reflection.

Instead of the channel-shaped protrusions in the back plate 2 (see FIGS. 1 and 3) of the above-described solar collector other means may be used for spreading the working liquid. For instance the back plate and/or the front plate may be lined with a wick. By the term wick is to be understood a layer of absorbent material in which the working liquid is distributed over the back plate and/or the front plate by capillary transport. The wick may be of a fibrous material or of a different form and material, such as used for heat pipes. A particularly suitable fibrous wick composed of a web is a wick of a polyvinyl alcohol marketed under the trade name Enka ® shammy. Further it is possible to use both channel-shaped protrusions and a wick, which may both be provided on the same plate or on different plates of the casing.

When use is made of a wick, it may be of advantage for it not to be in one piece, but to divide it into several pieces. With the solar collector of the embodiment shown in the drawing this would mean that the wick extending throughout each of the evaporating channels 3 does not consist of one long strip, but of several sections. Then each of these sections can retain the working liquid. Thus, the working liquid will no longer gradually flow down to the lowest point in the evaporating region, as may occur with a non-divided wick, which does not have its lowest end extend into working liquid. This divided wick moreover makes it possible for the solar collector more quickly to resume its function after periods without sunshine. To prevent leakage of the working liquid, the wick sections may be sealed at their lower ends or co-operate with some small channel in or on the respective plate for retaining the working liquid.

A particularly suitable means of receiving the working liquid consists of a layer containing voids that are capable of receiving the working liquid, but are disposed in generally spaced relationship.

This layer may be very thin. In the case of a collector surface area of, say, 1 m$^2$ and a sufficient number of liquid-receiving voids the layer need have a thickness of only a few hundred microns for the solar collector to function properly. In contrast to the situation with the known wicks there will be no or only very little capillary transport of the working liquid through this layer. On the whole it may be stated that working liquid which flows into some void or is formed in it as a result of condensation will remain stored in it until it evaporates again. In sunless periods wetting is consequently not limited to a section corresponding to the capillary rise, but the whole surface of the layer functions as a means of storing the working liquid. As a result, the solar collector will readily start working and consequently it will very soon have attained its maximum efficiency. A further advantage is that the height of the layer, and hence of the solar collector does not have any effect on its operation.

The layer may, for instance, contain glass powder, but preference is given to a layer of a substantially thermally conductive material, e.g., carbon powder, mica powder or metal powder. Proper themal conductance will contribute to the evaporation being attended with a minimum difference in temperature between the casing and the working liquid. Considering that an increase in the difference in temperature is attended successively with surface evaporation, nuclear boiling, and finally film boiling, the aim should be merely to obtain surface evaporation. By surface evaporation is to be understood the evaporation of the liquid; by boiling is meant evaporation with formation in the working liquid of vapor bubbles, which rise to the liquid surface; by film boiling is to be understood evaporation with vapor bubbles forming a vapor film on the interior surface of the casing. In the case of the above-discussed known solar collectors, where the working liquid practically entirely fills the evaporating region and the area of the surface of the working liquid in proportion to the volume of the working liquid is relatively small, evaporation will generally take place with boiling. The solar collector according to the invention, however operates within the range of surface evaporation. A suitable metal powder may be a powder of one or more metals or alloys. To impart sufficient coherence and "porosity" to the envisaged layer use may be made of a binder. A suitable binding material is epoxy resin. Also conceivable materials, however, are polyimide resins and polyester resins and metal glues based on acrylate. The starting material and the method of preparing the layer should be so chosen that in the layer voids are formed of which at least a sufficiently great number communicate with the evaporating region and whose dimensions and position permit receiving and retaining the chosen working liquid against gravity. Although the voids may to some extent communicate with each other, permitting some transport of liquid between the voids, care should be taken that the layer will not mainly act as a wick. The most favorable results are obtained with a layer which absorbs the working liquid at least mainly at the point where it is introduced. Spreading of the working liquid throughout the layer at the same rate as in the case of the wick is not quite desirable in that the layer will then unfavorably compare with the action of a wick. At a much lower spreading rate than in the case of the wick, however, the layer retains its advantage over the wick. For the formation of voids it may under some circumstances be desirable that to the binder there should be added an expanding agent. After the layer has been applied to the substrate, the expanding agent escapes while in the gaseous state, resulting in the formulation of a foamed layer containing voids. Whereas in this case the voids are formed from within the layer, they can also be introduced into it from an outside source. In that case it may be conceivable to pass a gas through the freshly applied layer. Alternatively, a crushed foam might be pressed into the binder/metal powder layer. The voids in the layer are formed then by existing voids in the crushed foam.

In another embodiment of the solar collector according to the invention the layer has voids that were formed mechanically. They may be obtained then by subjecting the layer to a locally applied pressure, for instance with the aid of gas jets or liquid jets or jets of solid particles. The direction in which the pressure is applied may be such that also with the layer taking up an oblique position, the force of gravity will contribute to keeping the condensate within the voids. A very suitable embodiment consists in that the voids in the layer are formed by needle punching.

According to a different method the envisaged "porous" layer is applied by flame-spraying. Further it is of advantage that viewed in return flow direction of the condensed working medium, the layer increases in thickness, whether stepwise or gradual. In the lower half of the layer a little more liquid can then be stored than in the upper half. As a result, the solar collector will be more prompt in resuming its operation after a sunless period.

It may moreover be of advantage for the "porous" layer to consist of strips extending transverse to the return flow direction of the condensed working medium. At their lowermost sides these strips might, if necessary, still be provided with a rim to stop the condensed working medium from flowing down to lower-positioned strips. In some cases it may be desirable for the layer to be profiled.

Further, the liquid spreading absorbing means may partly consist of a wick and partly of a porous layer, both being of the type discussed above. For instance, the wick may form the lower part and the porous layer the upper part, as viewed in the operating position of the solar collector.

In the following examples various methods are described by which the "porous" layer may be obtained.

EXAMPLE I

To an aluminium powder of the type LNR101 of the film of Hoechst and consisting of 50% by weight of particles of 0–50 $\mu$m and 50% by weight of particles of 50–100 $\mu$m water was added until the paste had acquired sufficient spreading consistency. To this paste there was added, with vigorous stirring, an epoxy resin (of the type Araldit AW 139) and a curing agent (of the type HV 998), both agents being marketed by Ciba-Geigy. Subsequently, the resulting product was evenly spread on a substrate of the same material as the front plate 1 with the aid of a knife coater. Then the layer thus obtained was dried for 1 hour at a temperature of 50° C. and finally heated to 90° C. for the epoxy resin to cure.

The resulting porous layer contained distributed voids which were in open communication with the ambient atmosphere but allowed little or no interchange of working liquid, viz. hexane. For a layer having a thickness of about 800 microns, the absorption capacity was about 300 grams of hexane per m$^2$.

EXAMPLE II

The procedure used in this example was the same as that used in the preceding example, except that use was made of glass powder having an average particle size of about 40 microns instead of aluminium powder. The resulting layer again contained voids for the working liquid that were generally separated from each other. As was to be expected the thermal conductivity of the layer was less than to that of the layer obtained in Example I, so that in that respect it was less suitable for use in solar collectors.

For a layer having a thickness of about 600 microns the absorption capacity was about 180 grams of hexane per m$^2$.

EXAMPLE III

In the procedure used in this example the porous layer was applied by flame-spraying. The layer was applied to one side of the steel plate. First the plate was blasted with coarse electro corundum (Abrasief M) to roughen its surface. Subsequently a sub-layer of nickel aluminide (Meteo 405 of the firm of Metco) was applied by flame-spraying followed by applying to it a top layer of a steel alloy (Metco No. 2) which was also done by flame-spraying. Both the substance of the sublayer, which served as adhesive layer, and that of the top layer were obtained by atomizing a wire of the respective material in an oxygen-acetylene flame. The material was applied to the plate by means of compressed air. The resulting final layer had a thickness of about 350 microns and its absorption capacity was 35 to 40 grams of hexane per m$^2$.

EXAMPLE IV 100 parts of epoxy resin (Araldit 134B), 40 parts of curing agent (H 4994), both marketed by Ciba-Geigy, and 140 parts of aluminium powder of the same type as used in Example I were properly mixed. To the resulting mixture there were added 14 parts of fine powdered $(NH_4)_2 CO_3$ as an expanding agent, after which the mixture was formed into a homogeneous paste, with vigorous stirring. Subsequently, the paste was evenly spread over a substrate of plate steel. The substrate thus treated was heated for 10 minutes at 80° C., after which heating was continued for 60 minutes at 100° C. The resulting expanded, porous layer satisfactorily adheres to the plate steel and displays distributed voids that communicate with the ambient atmosphere. For a layer having a thickness of about 0.5 mm the absorption capacity is 25 to 50 grams of octane per $m^2$.

Under some circumstances it may be desirable for the surface area of the layer to be enlarged by profiling. Such a provision may contribute, on the one hand, to several voids being in open communication with the evaporating region and on the other may reduce the distance to be covered by the vapor as it passes from the voids in which it is formed to the evaporating region, as a result of which the temperature gradient perpendicular to the layer will be smaller. The surface is preferably so profiled that the grooves extend transverse to the direction of flow of the condensate. More particulars about this detail and about the porous layer in general are described in the simultaneously filed U.S. patent application, Ser. No. 227,534 corresponding to Netherlands Patent Application No. 8 000 470, having the title "Solar collector provided with a working liquid absorbing layer". The above examples merely provide a few alternative methods of obtaining a layer having the desired properties. Not only may the layer contain other metals and binders than given in the examples, but it is also possible to make special provisions for promoting the formation of voids which are not or hardly in communication with each other but which do take up the working liquid. In this connection mention is made of the use of expanding agents in methods of the types described in Examples I and II. It is of importance then for the expansion to continue as long as is necessary for the formation of voids.

The favorable effect of the porous layer could be demonstrated experimentally when testing a solar collector as illustrated in FIGS. 4 through 17. It was placed in an insulated casing which was sealed by a glass plate. The front plate 1 of the solar collector was facing the glass plate. The casing containing the solar collector was placed on a test bench with the glass plate facing an artificial sun consisting of a number of flood lights type par 38. Into the evaporating space 300 cc of hexane had been introduced after the inside of the solar collector had been evacuated to below 1 millibar. Both to the front plate 1 and the back plate 2 a porous layer had been applied by the method of Example I. On the outside wall of the back plate there were 9 thermocouples for measuring the temperatures at the various points. They were all connected to a recording device.

Figure 18:
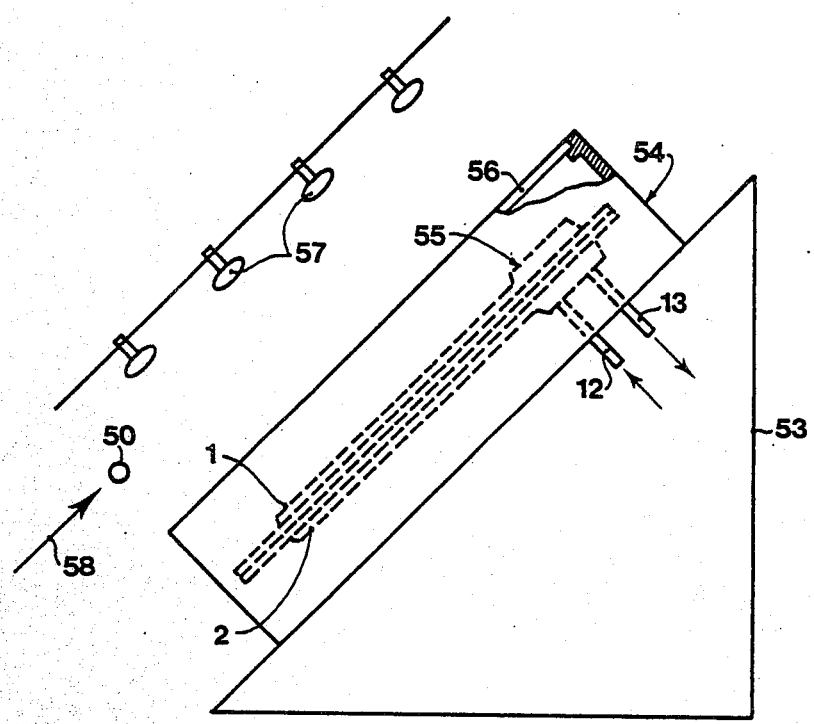
Figure 19:
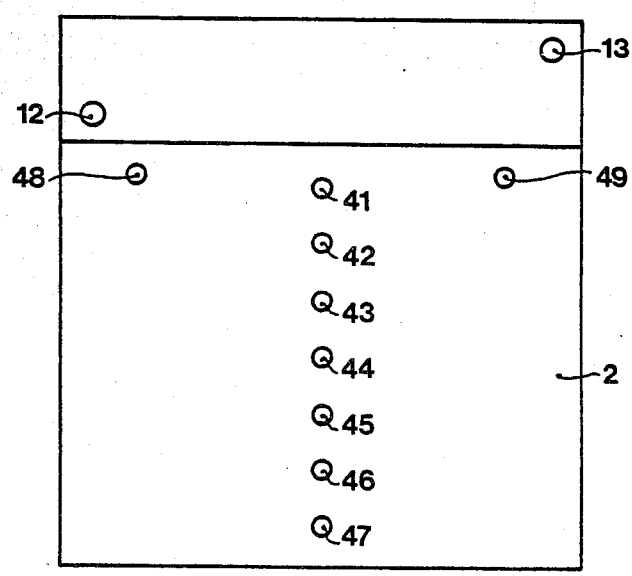

FIGS. 18 and 19 schematically show the set up of the test bench and the positions of the thermocouples.

In FIG. 18 the numeral 53 refers to a frame on which there is mounted an insulating casing 54 containing a solar collector 55 indicated by dash lines. The casing 54 is covered by a glass plate 56. Disposed at some distance from the glass plate 56 are flood lights 57 having a radiation power of 800 Watts per $m^2$. A fan (not shown in the drawing) provides an air flow in the direction indicated by the arrow 58 of 3 m/sec. between the lights 57 and the casing 54. Inside the air stream, but outside the radiation of the lights 57 a thermocouple is placed at a point 50 for measuring the ambient temperature. To the solar collector water of a constant temperature is fed at a rate of 1 liter per minute through the connection 12 of the cooling spiral. Positioned at the connections 12, 13 are thermocouples for measuring the temperature of the water flowing into and out of the collector.

The back plate 2 of the solar collector is also provided at different places with thermocouples, as is further shown in FIG. 19, which is a diagrammatic view of the back part of the solar collector comprising the back plate 2. In the middle of the back plate 2 there are provided a row of thermocouples 41 through 47 which are spaced at intervals of about 10 cm. They serve to measure the temperatures at various points on the back plate 2. On either side and at the same level of the thermocouple 41 there are mounted two thermocouples 48, 49.

First of all, with the artificial sun being switched off, water was passed for some time through the cooling spiral. Then the lights 57 were switched on. Right from the start the temperatures measured by the thermocouples were registered. FIG. 20 shows the resulting graphs. The temperature is plotted on the abscissa and the time on the ordinate. The vertical line 59 represents the constant temperature, during the experiment of the water flowing into the collector. At the moment $t_b$ when the lights 57 were switched on, which follows from the temperature line 60 which illustrates the variation in temperature of the outflowing water. The temperature lines for the thermocouples 41 through 47 practically coincide, as is illustrated in FIG. 20 by the single line 61. First the temperatures fairly soon reached a maximum value and after a short time decreased to an end value which is 1° to 2° C. higher than the temperature of the outflowing water. The temperature difference $\Delta T$ (see FIG. 20) between the inflowing and the outflowing water is a measure of the power emitted to the water.

When the experiment was repeated under the same conditions with a solar collector which only differs from the one tested first in that it is not provided with a porous layer, the temperature picture shown in FIG. 21 was obtained. As a result, 7 different temperature curves, 62–68, were recorded then, which correspond to the temperatures measured with the thermocouples 41-47. Only after some considerable time was a state of equilibrium attained. Such a long period is unfavorable in that during the period, the solar collector does not display its maximum efficiency. For, because of the high temperatures this starting phenomenon is attended with, more heat will be lost as a result of higher radiation, conduction and convection. Such unfavorable dynamic behaviour as a rule has a particularly disadvantages effect in climates where there are great variations daily in solar radiation. If these variations repeatedly occur and the sunny periods are shorter than the starting period of the solar collector, then its efficiency will remain low. The chance of that will, of course, be greater as the starting period of the solar collector is longer.

In the climates where interruptions in sunshine are few and far between use may be made of a differently constructed solar collector. In this alternative construction the inside surface of the plate 2 is provided with irregularities by which the area of said surface is enlarged to at least 1.5 times the surface area defined by the geometrical main dimensions of the plate without thereby causing any considerable capillary transport of the condensed working medium. In the case of a rectangular plate the "geometrical main dimensions" are to be understood here as the length and the width of the plate. Said irregularities may be obtained, for example, by subjecting the envisaged side of the plate to a roughening treatment, e.g., sandblasting, hammering, etc. The irregularities here serve to spread the condensate to the maximum extent on the plate in a direction transverse to the main direction of flow defined by gravity, and further to obtain the longest possible flow path to be followed by each condensate particle.

If the solar collector is to be prevented from delivering liquid having a temperature exceeding a certain desired temperature, then the circulation of this liquid through the cooling spiral may be terminated. However, it is also possible to make such a provision in the solar collector itself as will prevent the liquid from being overheated. It may be ensured then that the emission of heat by condensation of the evaporated working liquid is reduced. This may be accomplished by inhibiting the normal spreading of the condensate formed. To that end the condensate which is about to be overheated may be collected in an auxiliary reservoir which is not used during normal functioning of the solar collector. Running off of the condensate to this auxiliary reservoir may be brought about under the influence of the temperature or the pressure in the evaporating region.

FIGS. 23 through 28 are schematic views of various constructions for this purpose. In the construction according to FIGS. 23 and 24 use is made of a bimetal strip 74, which is attached to the lower end of the condenser 74. Suspended from the bimetal 75 is a reservoir 76. In the construction comprising toothed cooling plates 15, 16, a bimetal 74 with a reservoir 76 may be attached to each tooth 23.

Figure 23:
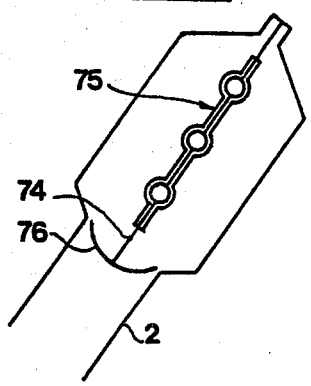
FIGS. 23 through 28 show a number of constructions for preventing overheating.
Figure 24:
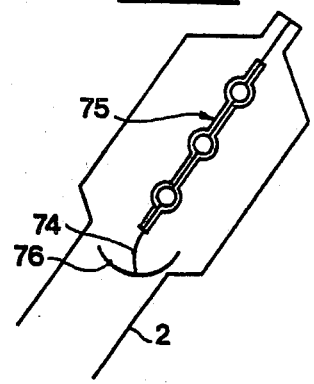

Under normal operating conditions, the bimetal strip is in the position shown in FIG. 23. Most of the condensate is then returned to the evaporating region. However, the moment the temperature of the bimetal strip exceeds a permissible value, it will deflect into the position shown in FIG. 24, in which the condensate is collected in the reservoir 76.

Figure 25:
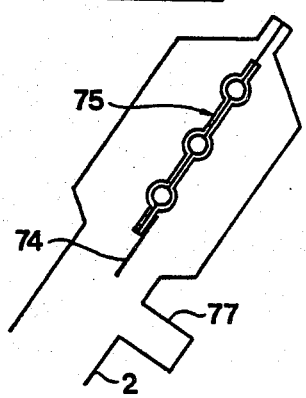
Figure 26:
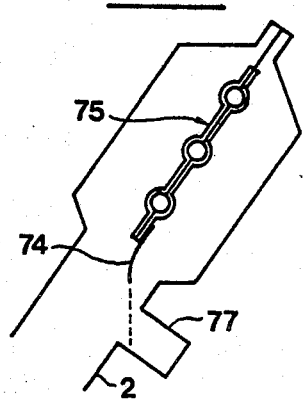

In the construction according to FIGS. 25 and 26 the back plate 2 contains a reservoir 77 which co-operates with a bimetal strip 74 attached to a condenser 75. When the permissible temperature is exceeded, the bimetal strip will deflect into the position shown in FIG. 26. The condensate will then drip into the reservoir 77. From there the working liquid can evaporate again, but the effectiveness thereof is considerably lower than when the working liquid is distributed over the entire back plate 2.

Figure 27:
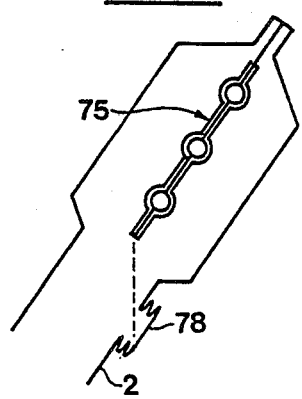
Figure 28:
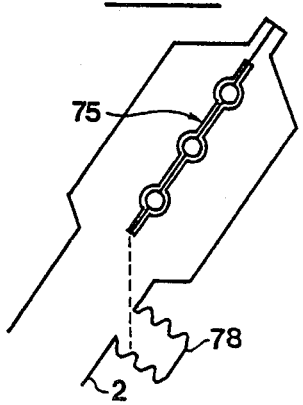

In the construction according to FIGS. 27 and 28 the protection against overheating acts on the pressure in the evaporating space. In the back plate 2 is a flexible bellows 78 whose inside communicates with the inside of the solar collector. In a normal situation the bellows has only a small volume, as indicated in FIG. 27. In the case, however, where the vapor pressure exceeds the value which corresponds to the permissible temperature, the bellows will expand to its maximum volume (FIG. 28). The condensate will then flow into the bellows.

The working medium to be used may be varied with operating conditions. For instance, instead of hexane it is possible to use other hydrocarbons, chlorinated and-/or fluorinated hydrocarbons, etc., or mixtures thereof.

What is claimed is:

1. A solar collector comprising:
   a closed casing having a substantially rectangular cross-section, from which non-condensable gases are at least substantially removed;
   a collector thermally connected to the casing and serving to convert solar rays into heat;
   a working medium contained in the casing, which working medium, in operation of the collector, is partly in the liquid and partly in the vapor state;
   an evaporating region in the casing, in which region the liquid working medium can evaporate under the influence of heat emitted by the collector;
   a condensation region in the casing, in which region the vaporous working medium can condense;
   a passage connecting the evaporating region and the condensation region permitting the internal return of condensed working medium to the evaporating region; and
   a heat exchanger which is in thermal contact with the condensation region for the discharge of heat of condensation to a heat storage medium contained in the heat exchanger, said condensation region including an inwardly folded wall which forms a space partially closed off from the ambient environment, which space is disposed within the outer boundary of the casing, but in isolation with the interior of the casing, said heat exchanger being accommodated in said space and in thermal contact with said folded wall, said heat exchanger including means defining an enclosed passageway for said heat storage medium in which the heat storage medium is separated from the working medium confined in the casing by said inwardly folded wall and by said heat exchanger.

2. A solar collector according to claim 1, wherein said wall comprises a gas-tight plate attached to the casing and the heat exchanger comprises a cooling spiral which is in thermal contact with the plate.

3. A solar collector according to claim 1, wherein said wall comprises a gas-tight assembly of two cooling plates attached to the casing and enclosing said space for the heat exchanger and said heat storage medium.

4. A solar collector according to claim 1, wherein said wall comprises a gas-tight assembly of two cooling plates which are attached to the casing and the heat exchanger comprises a cooling spiral enclosed between the cooling plates.

5. A solar collector according to claim 2 or 4, wherein said cooling spiral has ends which project transversely through the casing via passages provided therein and means at these passages for sealing the casing from the ambient atmosphere.

6. A solar collector according to claim 5, wherein the sealing means at the passages includes the assembly of cooling plates.

7. A solar collector according to claim 6, comprising supporting rings between the cooling plates and on the ends of the cooling spiral, said supporting rings having a relatively narrow part projecting through the passages and have one end face bearing against the inside of one of the cooling plates and the other end face, adjacent to said narrow part, bearing against the other cooling plate.

8. A solar collector according to claim 7, comprising a metal sleeve on the relatively narrow part of each supporting ring between the respective cooling plate and the inside of the casing, said a metal sleeve having ends welded to the cooling plate and the casing.

9. A solar collector according to claim 3 wherein said, casing comprises two plates which are so profiled that the evaporating region is divided into at least two parallel channels for transporting the working medium in the vaporous and in the liquid state, said cooling plates including projections that are disposed over the channels.

10. A solar collector according to claim 1 wherein said collector includes a sun facing part of the casing.

11. A method of collecting heat from solar energy, said method comprising transmitting solar energy to a working medium in an evaporation region to cause evaporation of at least a portion of the working medium, guiding the vaporous medium upwardly into a condensation region, condensing the varporous medium in said condensation region by heat exchange with a heat storage medium conveyed in a heat exchanger in said condensation region in non-contact isolation with the working medium, the heat exchanger being inserted into a folded wall portion of the condensation region to maintain non-contact isolation of the working medium and the heat storage medium respectively by the walls of the heat exchanger and the folded wall portion of the condensation region, conveying the heat exchange medium in the heat exchanger through a cooling spiral which is contained in the folded wall portion and is isolated from direct contact with the heat storage medium, the folded wall portion being secured to a casing of the condensation region at spaced locations such that the interior of the folded wall portion remains isolated from the heat exchange medium, connecting the spiral to the folded wall portion at said spaced locations by passing the spiral through openings in the casing which communicate with the ambient atmosphere, and returning the condensed working medium to the evaporation region, the evaporating region having vertical distribution channels therein, the condensed working medium flowing downwardly in said channels along the walls thereof.

12. A method as claimed in claim 11 comprising guiding the condensed working medium from the condensation region into said distribution channels.

13. A solar collector according to claim 4, wherein said cooling plates have ends at which said gas-tight assembly is attached to said casing, the zone of contact of said ends with said casing representing a minor portion of the surface area of said plates, the plates outside said zone of contact being suspended within the casing in spaced relation therewith for passage of said working medium around the plates.

* * * * *